No. 699,215. Patented May 6, 1902.
E. W. MÜLLER.
ELECTRICAL OUTLET BOX.
(Application filed Mar. 11, 1902.)
(No Model.)

WITNESSES:
F. W. Wright.
S. C. Connor

INVENTOR
ERNEST W. MÜLLER
BY
Howson and Howson
HIS ATTORNEYS.

United States Patent Office.

ERNEST W. MÜLLER, OF BROOKLYN, NEW YORK, ASSIGNOR TO HUBERT KRANTZ, OF BROOKLYN, NEW YORK.

ELECTRICAL OUTLET-BOX.

SPECIFICATION forming part of Letters Patent No. 699,215, dated May 6, 1902.

Application filed March 11, 1902. Serial No. 97,748. (No model.)

*To all whom it may concern:*

Be it known that I, ERNEST W. MÜLLER, a citizen of the United States of America, residing in the borough of Brooklyn, in the county of Kings, State of New York, have invented an Improved Electrical Outlet-Box, of which the following is a specification.

In setting electrical outlet-boxes in walls, ceilings, and other parts of buildings or other structures workmen are apt to be careless and frequently put the boxes in wrong position for the proper insertion of the lamp-socket or other electrical appliance.

The main object of my invention is to so construct such an outlet-box that its center can be shifted after it has been set in position.

Figure 1:
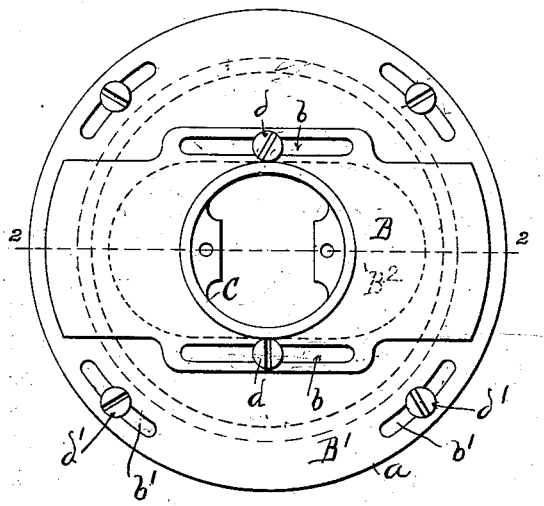
Figure 3:
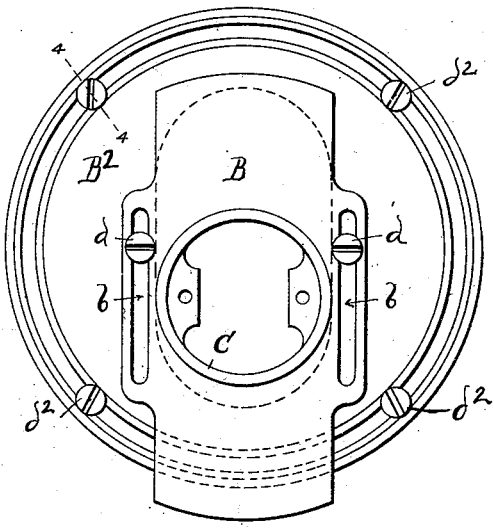
Figure 2:
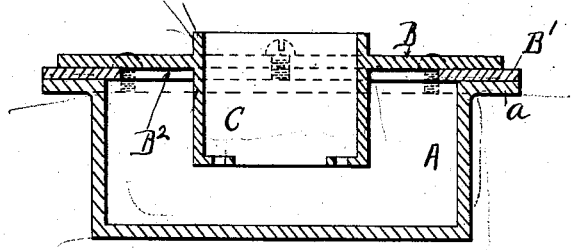
Figure 4:
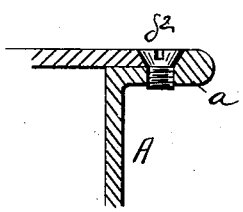

In the accompanying drawings, Figure 1 is a face view of an outlet-box embodying my invention. Fig. 2 is a sectional view on the line 2 2, Fig. 1. Fig. 3 is a face view similar to Fig. 1, but showing a modification and illustrating the center of the receptacle of the box shifted. Fig. 4 is a sectional view on the line 4 4, Fig. 3.

In the present instance I have shown the main body A of the box as of a cylindrical shape, but it may be of any other suitable form, and its front edge is preferably formed with an outwardly-projecting flange $a$. The cover of the box, which carries any suitable form of receptacle C for a lamp-socket or other electrical appliance, is made in two parts B and B', one adjustable on the other and both adjustable on the body of the box to permit the axis or center of the receptacle to be shifted within the box. The receptacle C is carried by the upper cover-plate B, and the latter is in the form of an elongated plate with longitudinal slots $b$, through which pass securing-screws $d$, threaded into the under plate B' of the cover. This under plate B' has an elongated slot $B^2$, Figs. 1 and 2, through which the receptacle C, carried by the upper plate, passes freely, the length of this slot lying in the same direction as the slots $b\ b$, Fig. 1, so that the plate B may be adjusted lengthwise on the plate B' within limits and therefore crosswise of the body of the box.

The lower plate B' is rotarily adjustable within limits upon the body of the box either by reason of the curved slots $b'$, through which pass the securing-screws $d'$, threaded into the flange $a$ of the box-body, Fig. 1, or by making the lower cover-plate of smaller diameter, as shown at $B^2$ in Fig. 3, with its circumference bearing against securing-screws $d^2$, Fig. 4, which serve to clamp the plates in any position to which they may be rotarily adjusted. By reason of this double adjustment—namely, the adjustment of the receptacle-carrying plate B crosswise of the box and the adjustment of both plates rotarily on the box—it will be seen that the center of the receptacle can be shifted to compensate for almost any error of a workman in setting the box in a ceiling, wall, or elsewhere, as illustrated in the example, Fig. 3.

I claim as my invention—

1. An electrical outlet-box having a receptacle-carrying part adjustable on the body of the box to shift the center of the receptacle.

2. An electrical outlet-box having a receptacle-carrying part adjustable crosswise and rotarily upon the body of the box to shift the center of the receptacle.

3. An electrical outlet-box, having a receptacle-carrying cover in two parts, one adjustable on the other and the two adjustable on the body of the box to shift the center of the receptacle.

4. An electrical outlet-box, having a receptacle-carrying cover in two parts, one adjustable crosswise on the other and the two adjustable rotarily on the body of the box, as and for the purpose described.

5. An electrical outlet-box having a receptacle-carrying cover adjustable crosswise of the body of the box, as and for the purpose described.

In testimony whereof I have signed my name to this specification in the presence of two subscribing witnesses.

ERNEST W. MÜLLER.

Witnesses:
S. KRANTZ,
ALFRED W. KRUGER.